(12) United States Patent
Hulme

(10) Patent No.: US 11,845,677 B2
(45) Date of Patent: Dec. 19, 2023

(54) PORTABLE MULTIMODE REVERSE OSMOSIS WATER PURIFICATION SYSTEM

(71) Applicant: Evoqua Water Technologies LLC, Pittsburgh, PA (US)

(72) Inventor: Clinton W. Hulme, Pennsburg, PA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 17/554,251

(22) Filed: Dec. 17, 2021

(65) Prior Publication Data

US 2022/0106207 A1 Apr. 7, 2022

Related U.S. Application Data

(62) Division of application No. 16/755,769, filed as application No. PCT/US2018/056059 on Oct. 16, 2018, now Pat. No. 11,235,990.

(60) Provisional application No. 62/573,461, filed on Oct. 17, 2017.

(51) Int. Cl.
*C02F 1/44* (2023.01)
*C02F 1/02* (2023.01)
*C02F 103/02* (2006.01)

(52) U.S. Cl.
CPC ............. *C02F 1/441* (2013.01); *C02F 1/02* (2013.01); *C02F 2103/026* (2013.01); *C02F 2201/005* (2013.01); *C02F 2209/02* (2013.01); *C02F 2209/03* (2013.01); *C02F 2209/42* (2013.01)

(58) Field of Classification Search
CPC ...... B01D 61/025; B01D 61/12; B01D 61/24;
B01D 61/58; C02F 1/02; C02F 1/441;
C02F 2103/026; C02F 2201/005; C02F
2201/008; C02F 2209/02; C02F 2209/03;
C02F 2209/42; G01N 1/4005; G01N
2001/4016
See application file for complete search history.

(56) References Cited

U.S. PATENT DOCUMENTS

| 4,166,031 A | 8/1979 | Hardy |
| 5,591,344 A | 1/1997 | Kenley et al. |
| 6,099,735 A | 8/2000 | Kelada |

(Continued)

FOREIGN PATENT DOCUMENTS

| CN | 205999072 U | 3/2017 |
| FR | 2465983 | 3/1981 |

(Continued)

OTHER PUBLICATIONS

"Mar Cor Purification Introduces the Millenium HX," Mar Cor Purification, 3027803 Rev. A, 2 pp., 2012.

(Continued)

*Primary Examiner* — Terry K Cecil

(57) ABSTRACT

A water purification system is disclosed which, includes a reverse osmosis (RO) system or component that is connectable to a city or other outside water feed that is capable of responding to and compensating for low or no feed water pressure coming into the RO system to ensure the outgoing supply of purified water is provided consistently and at a minimum water pressure. This can be accomplished without the need for communication with another device or system-wide facility, such as a hospital, or a pharmaceutical or semiconductor manufacturing system, requiring a constant water supply.

6 Claims, 1 Drawing Sheet

(56) References Cited

U.S. PATENT DOCUMENTS

| | | |
|---|---|---|
| 6,246,831 B1 | 6/2001 | Seitz et al. |
| 6,861,033 B2 | 3/2005 | Mullins et al. |
| 7,210,601 B2 | 5/2007 | Hortin et al. |
| 8,064,233 B2 | 11/2011 | Ishizu et al. |
| 8,506,885 B2 | 8/2013 | Kotsos et al. |
| 8,692,167 B2 | 4/2014 | Hedmann et al. |
| 9,151,516 B2 | 10/2015 | Buescher et al. |
| 9,322,258 B2 | 4/2016 | Henson et al. |
| 9,358,331 B2 | 6/2016 | Fulkerson et al. |
| 9,768,783 B1 | 9/2017 | Schmit et al. |
| 9,975,090 B2 | 5/2018 | Hoffman |
| 10,099,179 B2 | 10/2018 | Volker |
| 10,159,939 B2 | 12/2018 | Volker |
| 10,207,225 B2 | 2/2019 | Lutz et al. |
| 10,246,351 B2 | 4/2019 | Völker |
| 10,668,201 B2 | 6/2020 | Wrazel et al. |
| 2002/0100716 A1 | 8/2002 | Bosko |
| 2003/0034305 A1 | 2/2003 | Luehmann et al. |
| 2007/0102357 A1 | 5/2007 | Weatherill |
| 2014/0151297 A1 | 6/2014 | Hulme et al. |
| 2015/0027937 A1 | 1/2015 | Katou et al. |
| 2015/0273090 A1 | 10/2015 | Felding et al. |
| 2018/0236156 A1 | 8/2018 | Glaser |
| 2019/0083934 A1 | 3/2019 | Moon et al. |
| 2019/0299163 A1 | 10/2019 | Kim et al. |
| 2021/0002438 A1 | 1/2021 | Hulme |

FOREIGN PATENT DOCUMENTS

| | | |
|---|---|---|
| WO | 99/55448 | 11/1999 |
| WO | 03/40042 | 5/2003 |
| WO | 2007/0045015 | 4/2007 |
| WO | 2015/100502 | 7/2015 |
| WO | 2016/0086737 | 6/2016 |
| WO | 2017/171406 | 10/2017 |
| WO | 2017/218932 | 12/2017 |
| WO | 2018/036753 | 3/2018 |

OTHER PUBLICATIONS

"Millenium HX: Portable Water Purification System w/ Automatic Hot Water Disinfection," Mar Cor Purification, 3027573 Rev. C, 2 pp., 2012.

"Purification Millenium HX Reverse Osmosis Unit Operation and Maintenance Manual," Mar Cor Purification, 3026177 Rev. B, 154 pp., Apr. 16, 2012.

Gambro, WRO 300 Operator's Manual, Sep. 2010, pp. 11, 22 and 24 (accessed on Oct. 14, 2016 at https://www.manualslib.com/manual/439580/Gambro-Wro-300-H.html).

International Preliminary Report on Patentability of the International Searching Authority dated Apr. 30, 2020 of International PCT Application No. PCT/US18/56049 filed Oct. 16, 2018,.

International Preliminary Report on Patentability of the International Searching Authority dated Apr. 30, 2020 of International PCT Application No. PCT/US18/56059 filed Oct. 16, 2018.

International Preliminary Report on Patentability of the International Searching Authority dated Apr. 30, 2020 of International PCT Application No. PCT/US18/56063 filed Oct. 16, 2018.

International Search Report and Written Opinion of the International Searching Authority dated Dec. 13, 2018 of International PCT Application No. PCT/US2018/56049 filed Oct. 16, 2018.

International Search Report and Written Opinion of the International Searching Authority dated Feb. 12, 2019 of International PCT Application No. PCT/US2018/56063 filed Oct. 16, 2018.

International Search Report and Written Opinion of the International Searching Authority dated Jan. 4, 2019 of International PCT Application No. PCT/US2018/56059 filed Oct. 16, 2018.

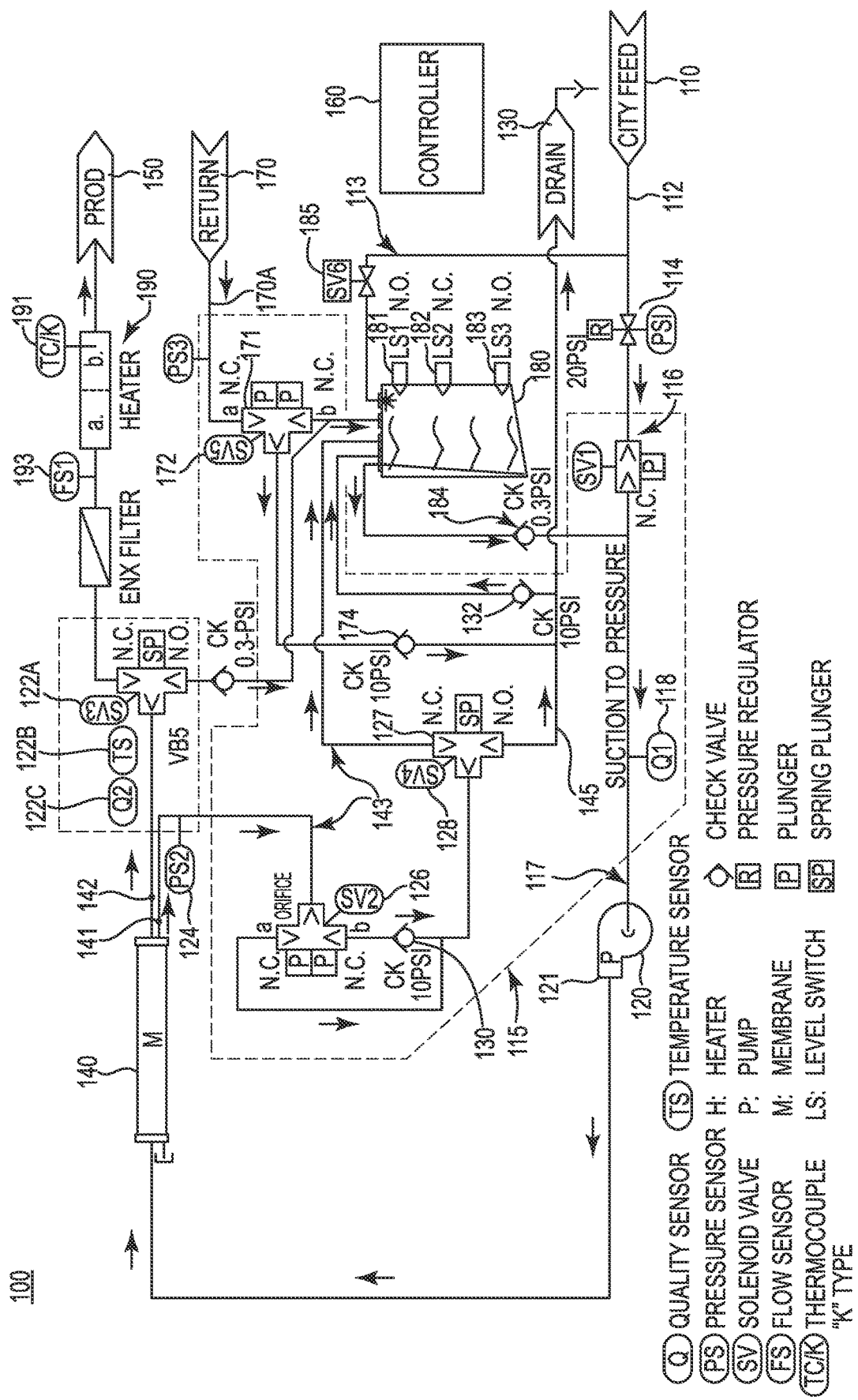

PORTABLE MULTIMODE REVERSE OSMOSIS WATER PURIFICATION SYSTEM

CLAIM OF PRIORITY

This application is a divisional of U.S. patent application Ser. No. 16/755,769, filed on Apr. 13, 2020, which is a United States National Filing Under 35 U.S.C. § 371 from International Patent Application No. PCT/US18/56059, filed Oct. 16, 2018, which claims the benefit of priority of U.S. Provisional application with Ser. No. 62/573,461, filed on Oct. 17, 2017, entitled PORTABLE MULTIMODE REVERSE OSMOSIS WATER PURIFICATION SYSTEM. These applications are incorporated herein by reference, in their entireties.

CROSS-REFERENCE TO RELATED APPLICATIONS

This application relates to U.S. Patent Publication No. 2014/0151297, filed on Nov. 27, 2013, and entitled "Portable Reverse Osmosis Water Purification System," the disclosure of which is incorporated by reference.

TECHNICAL FIELD

The present disclosure relates to water purification systems. More specifically, the present disclosure relates to a portable or installed reverse osmosis water purification system requiring a steady and reliable city feed water supply.

BACKGROUND

Reverse osmosis (RO) is a filtration method that removes many types of large molecules and ions from solutions by applying pressure to the solution when it is on one side of a selective membrane. More formally, RO is the process of forcing a solvent from a region of high solute concentration through a semipermeable membrane to a region of low solute concentration by applying a pressure in excess of the osmotic pressure. The result is that the solute is retained on the pressurized side of the membrane and the pure solvent is allowed to pass to the other side. The membrane is selective in that large molecules or ions are not allowed through the pores in the membrane, but allows smaller components of the solution (such as the solvent) to pass freely. RO filtration has various applications, including drinking water purification, wastewater purification, food industry uses (e.g., for concentrating food liquid), and health care uses (e.g., dialysis systems).

Installed or portable RO systems or other water purification systems are used for providing pure water to a dialysis machine, a medical facility or to a pharmaceutical or a semiconductor manufacturing facility where a clean reliable, uninterrupted water supply is necessary. Interruptions in clean water supply can lead to medical treatment lag times or cancellations or can lead to the contamination of or the improper manufacturing of expensive pharmaceutical or semiconductor products. In some cases, the external water supply provided by the city or town may lack sufficient pressure to reach higher floors in a building or can experience fluctuations due to other city users leading to interruptions in the water supply. The challenges are even greater where portable RO machines are being used which are incapable of operating with zero or very low water pressures.

It would be highly advantageous to the market to provide a portable or standalone RO system or water purification system with the capability to compensate for disruptions in city or facility water supply pressure or low water pressure and in some cases no water pressure for an extended time to avoid disruptions in medical treatment or sensitive product manufacturing. Further, it would also be advantageous to be able to respond to external water supply interruptions without the need to communicate or coordinate with the operator or the devices and systems connected to the water purification system.

SUMMARY

In one example embodiment, there is provided a system for maintaining a constant water supply from an external widely pressure fluctuating feed water supply, the system includes a reverse osmosis (RO) system having a first water inlet and a second water inlet sourced from a two-valve split coupled directly to an external feed water supply, the second water inlet directing the external water supply through an internal storage tank, the first and second water inlets terminating at a common feed supply for a pressurizing pump, the at least one pressurizing pump adapted to receive water primarily from the internal storage tank and alternatively from the external feed water supply, the pump configured to provide water to a RO membrane unit and deliver purified water through a delivery conduit to an external device or system. The system further includes a first solenoid valve coupled between the first water inlet and the pump inlet of the at least one pressurizing pump, the first solenoid valve operable as a function of the feed water pressure in the storage tank. The system also includes a second solenoid valve coupled to the second water inlet between the external feed water supply and the internal storage tank, the second solenoid valve controllable as a function of a feed water pressure in the storage tank, wherein an outlet of the tank is coupled to an inlet of the pump. The system further includes a controller module including an operating program configured to monitor and measure feed water pressure and water levels within the internal storage tank and the external water supply, wherein the controller module is configured to open the first solenoid valve to allow a flow of external feed water to the pump inlet upon sensing the feed water pressure from the storage tank dropping below a predefined level and wherein the controller module is configured to increase a pump rate of the pressurizing pump so as to form a suction force on the external feed water supply upon a drop in an external feed water pressure below a predefined level The system in addition includes at least one storage tank water level sensor system communicatively coupled to the controller module and configured to measure water stored within the internal storage tank so as to maintain the water level to a predetermined fill level. In a related embodiment, further comprising a third solenoid valve coupled to a return port of the RO system and responsive to a signal from the controller module for directing water to fill the internal storage tank using the external feed water supply. In a related embodiment, upon receiving a signal from a level sensor of the storage tank that the tank is filled, the controller sending a signal to the pump to cease and signaling the first solenoid valve to close and cease the flow of the external feed water supply. The system also provides for a pure water flow path configured to allow unused purified water to return via a flow into the internal storage tank.

In various related embodiments of the system, upon receiving a signal of an increase of the feed water pressure of the storage tank is above a predefined level, the controller module provides a signal to close the first solenoid valve and signals the pump to decrease the pump rate to the RO membrane. In a related system, the controller module includes a heat forward sanitizing program configured to control the heating element and an integrated temperature sensor to sanitize an external device coupled to an output port of the system. In yet another related system, a waste water flow path configured to allow waste water from the RO membrane to be combined with unused purified water to return via a flow into the internal storage tank.

In another example embodiment, there is provided a method for maintaining a constant water supply from an external feed water supply to an external device or system, the method including the steps of providing an RO system having an internal storage tank for providing water to an external device and utilizing an internal pump to provide the water from the storage tank to the external device and monitoring the internal storage tank to ensure a water supply pressure and water levels are at predefined levels. Next, the method includes initiating via a controller a flow of water from an external feed water supply upon opening a first solenoid valve and using the internal pump when water levels and pressure from the storage tank are below predefined and closing a second solenoid valve coupled to the external feed water supply. The method further includes the step of directing external feed water to the RO system through an RO membrane to the external device. In a related embodiment, the method further includes the step of increasing a pump rate of the pressurizing pump so as to form a suction force on the external feed water supply upon a drop in the external feed water pressure below a predefined level.

In related embodiments, the method includes one of: a) directly filling the internal storage tank using the external feed water supply in response to a signal from the controller and a storage tank sensor system; b) automatically closing the first solenoid valve and decreasing the pump rate of the pressurizing pump upon sensing an increase of the feed water pressure above a predefined level in the storage tank; and c) closing the first solenoid valve and isolating the internal storage tank and solely using the storage tank water for RO functions after opening the second solenoid valve. The method further includes a purge function that includes directing feed water to the RO system only includes water from the storage tank during a purge function of the RO system. The method also includes a cooling function in which the step of cooling the RO system is performed by directing one of feed water from the storage tank or the external feed water supply.

In related example embodiment, there is provided a system for maintaining a constant water supply from an external feed water supply, the system including a water purification system that is not necessarily limited to chemical purification and is not limited to controlling the flow of water in a system. The teachings provided herein can apply to controlling fluid flow in other systems and applicable to other fluids.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWING

FIG. 1 is a schematic view of an embodiment of a RO based water purification system providing a sustained, uninterrupted purified water source for various applications.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DESCRIPTION OF THE PREFERRED EMBODIMENTS

Referring now to the FIGURES, FIG. 1 illustrates a schematic view of an embodiment of a RO based water purification and supply system that provides a sustained, constant purified water source for various applications. In other embodiments, the water purification system is chemical or heat based with the teaching herein not being necessarily limited to RO systems for water purification. In this example embodiment, a multimode water supply system 100 purifies water provided by a city or township feed water supply 110 for use in various applications, such as hemodialysis, other medical treatments or use in manufacturing systems needing a reliable uninterrupted clean water supply. System 100 provides processes for monitoring for feed water pressure, feed water quality, feed water temperature, pump outlet pressure, product (or purified) water pressure, product (e.g., purified) water temperature, product water quality and, when desired, membrane performance (percent rejection). In this example embodiment, a variable frequency pump 120 provides the pressure required to push water through a RO membrane 140 and against a fixed orifice. Fluid controls (solenoid valves, check valves, and temperature and pressure sensors) along with a controller module 160 provide a means of managing flow rates and pressures.

Although, RO based multimode water supply system 100 can provide for sanitizing with heated purified water, in this particular embodiment the focus of the invention described herein is to provide a reliable water source for normal dialysis operation from a good feed pressure water source (such as storage tank 180) or to sustain such dialysis operation from a poor feed pressure alternative flow that includes directly drawing water from a city feed such as city feed 110. Water supply system 100 includes having a first inlet 112 that splits off to a second inlet 113 for providing potable water to storage tank 180 from an external (city) potable feed water supply 110. System 100 further includes a pressure regulator 114 and a solenoid valve assembly 116 coupled to the city water supply at first water inlet 112 and a solenoid valve assembly (SV6) 185 coupled to second water inlet 113, both solenoid assemblies being communicatively coupled to controller module 160. An internal storage tank 180 is provided for storing purified water and is the main/primary source of water for the multimode water supply system. Water supply system 100 has at least one RO membrane unit 140 (or any other water purification subsystem) that receives water from potable feed water supply 110 and which purifies the water and delivers the purified water through a delivery conduit 142 and eventually provides purified product water at product/purified water outlet 150. System 100 also includes a return outlet 170 for directing excess or unused product water to either storage tank 180 or to a drain outlet 130. In this example embodiment, drain outlet 130 can also receive waste water from membrane 140 via conduit 141 and through solenoid valve (SV2) 126 and solenoid valve (SV4) 128, having a single coil such that a normally closed (NC) part of the valve is closed (no electricity provided) and directs the water to drain 130. When the normally closed (NC) portion of the solenoid valve is open (energized electrically by signal from controller 160), then water is directed to tank 180. The normally open (NO) portion of solenoid valve 128 is in a fail-safe mode of being open. The drain output 130 may be connected to a receptacle or other system for proper disposal of the drain fluid.

In this example embodiment, multimode water supply system 100 can use controller module 160 to provide several functions including activating a heat or chemical sanitizing cycle within the water supply system, and that is also programmed to operate the various components of the system 100 and controls the various solenoid, quality/temperature sensors and check valves that control water/fluid flow in system 100. Optionally, controller module 160 further includes a heating power management control circuit to drive heated sanitized purified water solely through the water supply system. The system described herein provides various advantages including but not limited to addressing issues of low RO system water pressures and low external city feed water pressures; the ability to switch from break tank mode (storage tank usage only) to external feed or city water and then switch back again automatically; and being able to operate the disclosed system even down to levels of no water pressure or supply from the external source without damaging the basic RO system. System 100 also advantageously is able to isolate portions of the internal systems unlike central RO systems such as being able to automatically shut off the storage tank system using solenoid valves or shutting off the city feed source using the solenoid valve when the external city feed is no longer needed. The increase solenoid valve and check valve count along with the additional pressure and temperature sensors, working in conjunction with controller 160, allows for precise control of specific flows within system 100. For instance, the addition of solenoid valve SV6 allows for direct feeding or filling of the storage tank 180 only. The switching valves in system are hardwired with controller 160 but it is within one skilled in the art to reconfigure the solenoid valves to include wireless communication modules to facilitate wireless communication with controller 160 or other system-wide or network controllers that may operate wirelessly or in a network configuration.

Referring again to FIG. 1, in this example embodiment of multimode RO system 100 there is included a series of solenoid valves (SV), check valves (CK) and conductivity sensors (Q) that are housed in main manifold 115 to facilitate precise control of not only heating and cooling flows throughout the RO system as well as a heat forward process but also the multimode sourcing of product water being supplied to the dialysis machine as described herein. Solenoid valve (SV1) 116 is a rinse water solenoid that is a normally closed valve used during the purge, rinse and the heat forward process. It is also open if there is not enough water in the internal water tank 180 during normal dialysis operation. Solenoid valve (SV2) 126 is a waste water valve assembly that includes two solenoids. During normal dialysis operation SV2a is closed and water flows through the orifice hole. The valve is open during flushing, chemical and heat disinfection processes. Solenoid valve SV2b opens during the heat forward process to provide a specific amount of backpressure on the membrane. Solenoid valve (SV3) 122A is a product water solenoid that is normally closed. During startup, the water flow is diverted and once the product water quality improves below a product water quality alarm, it opens and supplies water to the product line and product outlet 150. Solenoid valve (SV4) 128 is a waste recycle control solenoid which is a 3-way valve that directs waste flow to the drain 130 of RO system 100. This solenoid valve can also recycle waste water into internal tank 180 when the RO system is set up for a water saver function for re-use or re-application later (see upper path 143 arrow directed towards tank 180) when its coil is energized via a signal from controller 160. Solenoid valve (SV5) 172 is a product water return solenoid valve having two solenoids (having NC and NO functions): a) solenoid SV5a provides backpressure during normal operation of the RO system allowing it to supply product water at a pressure of approximately 30 psi and during heat and chemical modes, this valve is open by pressure mechanically allowing full flow for proper operation, but can also be opened by energizing the coil from a signal received from controller 160; and b) solenoid SV5b, which has to be energized (via a signal from controller 160), allows product water to flow to tank 180 or direct to drain 130. Finally, solenoid valve (SV6) 185 is an inlet water solenoid valve which provides feed water to the internal tank 180 from city feed 110 during operation of the RO system during chemical rinse, heat forward and normal dialysis processes (should water pressure from water sourced at storage tank 180 drop substantially).

Referring again to FIG. 1, a series of check valves are provided that operate with the various solenoid valves and controller 160 to control the various flows for various processes including the multimode water supply process described herein. A check valve (CK1) 130, which is located on the waste side of the membrane 140 along conduit 141, provides backpressure during certain processes including the heat forward process. A check valve (CK2) 174, which is located between the drain line 130 and solenoid valve (SV5) 172, prevents waste water from entering the product line 150. A check valve (CK3) 132, which is located between the internal tank 180 and drain 130, will divert water to the tank if the drain line is obstructed. A check valve (CK5) 184, which is located in the tank outlet path to the pump 120, prevents city feed water 110 from being fed into internal tank 180.

RO system 100 also includes a series of conductivity sensors (Q) which are in communication with controller 160 as well as the solenoid valves and check valves to control flows within system 100. An RO feed water conductivity sensor (Q1) 118 monitors the quality and temperature of the inlet water to pump 120 is a temperature compensated sensor. Inlet water quality and temperature can be viewed from an ANALOG screen on the RO system display/GUI (user interface). This value is compared to the product water quality reading to calculate the percent rejection. A product water conductivity sensor (Q2) 122C monitors the quality and temperature, with temperature sensor 122B, of the water after it exits the membrane 140. Product water quality can be viewed from a RUN screen during normal operation and this value is compared to the inlet water quality reading to calculate the percent rejection. Temperature can also be viewed from the ANALOG screen of the RO system 100 display and this temperature sensor 122B is also temperature compensated. An RO feed water pressure sensor (PS1) (near regulator 114) monitors the incoming water pressure to the RO system 100 and will shut down the RO system if there is low or high RO feed water pressure. The feed water pressure can be viewed from the ANALOG screen. A pump outlet pressure sensor (PS2) 124 monitors the output of the pump 120 and will shut down the RO system if an overpressure or under-pressure condition is sensed. The pump outlet pressure can be viewed from the RUN screen of the system display and pump pressure can also be viewed from the ANALOG screen. A product water pressure sensor (PS3-near return 170) monitors the product water pressure and will shut down the RO system if an overpressure condition is detected. The product water pressure can be viewed from the RUN screen or from the ANALOG screen. A pressure regulator (PR) 114 controls the incoming feed pressure to the RO system when solenoid valve (SV1) 116 is open. A flow sensor (FS1) 193 monitors the flow of product water from the membrane 140, thereby displaying flow on the RUN screen or the ANALOG screen. A thermocouple (TC/F) 191, which is located near heater 190, monitors the temperature of the water exiting heater 190. The temperature is displayed on the RUN screen and can also be viewed from the ANALOG screen.

In this example embodiment, system 100 includes at least one pressurizing pump 120 adapted to receive water from one of: a) the storage tank 180, while the system is operating a break tank mode with solenoid valve 185 being the primary water source (primary mode); or b) from city feed water inlet 112 via solenoid valve 116 which is the low or zero pressure feed source that provides water to a RO membrane unit 140 should the water pressure be insufficient from storage tank 180 (meaning water levels may be very low and pure product water is not being produced fast enough), thereby delivering purified water through a delivery conduit 142 to an external device (e.g., dialysis machine) or system requiring a constant water supply of purified water. When water is drawn via valve 116 from city feed 110 as the alternate source in the normal run mode for the dialysis machine, check valve 184 follows pressure conditions set by the state of valve 116 to close this path. Controller module 160 includes an operating program that monitors the internal water pressure from storage tank 180 while in break tank mode, and monitors external feed water pressure provided by city feed 110, analyzing water levels via level sensors 181, 182 and 183 within internal storage tank 180. While in the normal dialysis run mode and with good feed pressure, the primary water source is from city feed 110 through solenoid valve 185 via line 113 and through storage tank 180. Water then flows through check valve 184 and then to inlet 117 of pump 120 to be pumped through membrane 140 and out to product outlet 150. Hence, in the primary operating mode, where there is adequate city feed pressure, city water enters the tank to a controlled set of predetermined level points. A volume of raw city water is then consumed by a suction at the inlet of pump 120 as it supplies membrane 140 with pressurized water for the production of purified product water. In the meantime, system 100 attempts to fill the water level in tank 180 and attain water levels between the predefined level set points measured by the level sensors (LS).

When system 100 is in the normal dialysis operating run mode and water pressure runs low or there is poor feed pressure (such as from tank 180), an alternate water source is provided from city feed 110 via solenoid valve 116 through line 112 through to inlet 117 of pump 120. Pump 120 then begins to draw water from city feed 110 if the pressure is too low so as to stabilize the water flow and pressure going to membrane 140. Check valve 184 closes once solenoid valve (SV1) 116 opens as it responds to feed pressure conditions, automatically without the need for a direct signal from controller 160, as check valve 184 (as all check valves in the system) is a passive component. In this current mode (non-break tank mode), controller module 160 also initiates an increase in a pump rate of the pressurizing pump 120 so as to form a suction force on the external feed water supply 110 upon a drop in the city feed water pressure below a predefined level or a drop below a predefined level at storage tank 180. Water is then being drawn via suction from city feed 110 from pump 120 responsive to a signal from controller 160 and from the storage tank level sensors to directly fill the internal storage tank 180 using external feed water supply 110 as water is being supplied to membrane 140 if there is enough water to conduct both operations. Storage tank 180 begins to refill though solenoid valve 185 via line 113 and once storage tank 180 is filled to level 1 (LS1) of sensor 181, controller 160 switches system 100 back to break tank mode and shuts down pump 120 from drawing water directly from city feed 110. The level of the fluid in internal tank 180 is measured by the level sensors 181, 182 and 183. The level sensor 181 is triggered when water in tank 180 is at or above a maximum water level, level sensor 182 is triggered when water in tank 180 is at or below an intermediate water level, and the level sensor 183 is triggered when the water in tank 180 is at or below a minimum water level. Hence, in the second operating mode, where there is an inadequate city feed pressure and city water is entering tank 180 but the tank level is unable to reach beyond a set point for a period of time or the tank level remains at the lowest point with the tank supply valve open, feed water is then supplied directly to the pump inlet 117 with this second operating mode canceling out upon the tank level of tank 180 recovering or reaching its normal maintained preset water levels of the primary mode of operation of system 100.

In a third operating mode, pure product water is collected during a purge function of RO system 100. In this mode, city feed water is directed to inlet 117 of pump 120 to supply water to membrane 140. Pure water coming from membrane 140 is then directed and stored in tank 180 for other process uses, such as for purging membrane 140 and flowing pure product water through critical RO flow paths prior to entering a self-heat disinfection mode or chemical application mode. During a purge cycle, storage tank 1800 is emptied and no city feed water flows into the tank, hence solenoid valve 185 and solenoid valve 116 are closed. Thereafter, storage tank 180 is refilled with only pure water sourced from city feed water 110 via solenoid valve 116 through to inlet 117 of pump 120. Water then flows from membrane 140 through delivery conduit 142 through product outlet 150 and it returns to return inlet 170 to tank 180 via line 170A. Advantageously, a single pump 120 in this system provides the various functions including reverse osmosis water generation and directing pure product water from either the storage tank or the city feed in low pressure situations. Upon purging the entire system 110, pure product water from storage tank 180 is used such that the water flows through check valve 184 through pump inlet 117 and the water is pumped by pump 120 through membrane 140 and then through conduits 141, 143 and 145 and out to drain 130. Check valve 184 is at an outlet of tank 180 and prevents pump 120 feed water from being fed back into tank 180. The other part of system 100 is purged as water from membrane 140 flows through conduit 142 out to product outlet 150 and returns to return port 170 through solenoid valve 172 and then through check valve 174 before going out to drain 130. Check valve 174 is connected between drain output 130 and is configured to relieve pressure in the drain line when the drain output 130 is not connected or not functional. A solenoid valve 185 is controllable to prevent backflow of water in internal tank 180 into city feed water input 110 during the purge cycle. These disinfection and chemical application processes actually have better outcomes when performed with high grade product water as described above.

In a fourth operating mode, and while RO system is operating in either the first or second modes, RO concentrate or waste water and/or unused product water can be combined and stored in tank 180 for eventual reprocessing through membrane 140. This fourth operating mode provides the advantages of the recovery and re-application of unused water while offering some level of water consumption efficiency over time. In a fifth operating mode, the volume of water in tank 180 is isolated and then is consumed by RO system 100 as it flows to various outlet points to drain 130. In this operating mode the tank is emptied and made available for pure water storage of the third mode and other processes.

In summary, the multimode system 100 described herein provides the advantages of supplying dialysis grade water at adequate flows with zero city feed pressure applied as long as the feed water supply is available for suctioning by pump 120 (as if being supplied from tank 180 while in the break tank mode). Poor city feed conditions are too often the case in hospital facilities nationally and internationally (and even other industrial facilities such as in pharmaceutical or semiconductor device production), hence this provides a solution and an substantial advantage in continuing to provide water to a desired consumption point or process without disrupting the patient treatment (or production) and without investing in infrastructure equipment to increase water production at the point of the water source coming into the facility.

System 100 further includes a waste diverting valve 127 which allows water flow via 143 into one of the internal storage tank 180 (upper path) and a (lower path) waste path 145 to external drain 130. A pure water flow path 170A from return outlet 170 allows unused purified water to return via an inlet flow 171 into the internal storage tank 180. System 100 further includes a water product return solenoid valve 172, via check valve 174, coupled to drain outlet 130 and communicatively coupled to the controller module, which facilitates the drainage of storage tank 180.

The increased solenoid valve count of system 100 also provides the advantage of rapid cool down of the RO system as cool water can be added to the system from either storage tank 180 or from city feed 110. There is also more precise control of the waste water function due to the various check valves incorporated into the system working with the various solenoid valves. There is now a hard flow path that is configured from membrane 140 to drain 130 to dispose of waste water more quickly and efficiently. Further, due to the improve flows and pressure and measurement of such flows, system 100 can heat up more quickly and reach target heat temperatures taking the time down from three (3) hours in prior art systems to one (1) hour in system 100, depending on the temperature of the incoming water being supplied to system 100. Hence, this allows for single self-heat disinfection of the RO system without the use of chemicals to disinfect the RO system. When system 100 is in a heat storage mode, system 100 can be cooled down more quickly before patient use due to the capability of controlling flows within system 100. Finally, if chemicals were used in the RO system for cleaning and disinfection, such can be flushed out through drain 130 faster due to direct valve control by controller 160 (and the associated solenoid valves).

In this example embodiment, system 100 also includes a variable frequency drive (VFD) pump 120 that is coupled to an RO membrane unit inlet 139 and that is communicatively coupled to controller module 160. Pump 120 generally controls the fluid pressure through system 100 and generally controls water pressure input to membrane 140. In some embodiments, pump 120 maybe a pump other than a VFD pump and has a pump pressure of about 160-200 pounds per square inch (psi) (1.10-1.24 MPa). In some embodiments, a pump includes a pressure sensor used to control the operation of VFD pump 120 so as to shut down system 100 if an overpressure condition is detected. In this example embodiment, VFD pump 120 is designed to operate at a first pumping rate until an average water supply temperature and pressure (provided by tank 180) is determined and once an appropriate predefined temperature and pressure is achieved then transitioning to a second pumping rate. VFD pump is further designed to draw water from city feed 110 to stabilize VFD pump 120 from low levels of water in tank 180 and to maintain water flow and supply to the connected device or dialysis machine.

In a related embodiment, system 100 further includes a heating element responsive to the controller module configured to assist with a heat sanitizing function of the RO system components, wherein the controller module includes a heat forward sanitizing program configured to control the heating element and an integrated temperature sensor to sanitize an external device coupled to an output port of the system.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

I claim:

1. A method for maintaining a constant water supply from an external feed water supply to an external device or system, the method comprising the steps of:
providing an reverse osmosis (RO) system having a first water inlet and a second water inlet sourced from a two-valve split coupled directly to the external feed water supply, the second feed inlet directing water from the external feed water supply through an internal storage tank, the first and second water inlets terminating at a common feed supply for an internal pump configured to deliver water to an RO membrane;
monitoring the internal storage tank to ensure a water supply pressure and water levels are at predefined levels;
initiating, via a controller, a flow of water from the external feed water supply by opening a first solenoid valve in flow communication between the first water inlet and the internal pump and using the internal pump when water levels and pressure from the storage tank are below the predefined levels;
closing a second solenoid valve in flow communication between the second water inlet and the internal storage tank;

increasing a pump rate of the internal pump so as to form a suction force on the external feed water supply upon a drop in an external feed water supply pressure below a predefined level; and directing external feed water to the RO system and through the RO membrane to the external device.

2. The method of claim 1 further comprising a step of directly filling the internal storage tank using the external feed water supply in response to a signal from the controller and a storage tank sensor system.

3. The method of claim 1 further comprising a step of automatically closing the first solenoid valve and decreasing the pump rate of the internal pump upon sensing an increase of the water pressure above a predefined level in the storage tank.

4. The method of claim 3 further comprising a step of closing the first solenoid valve and solely using the water from the storage tank for RO functions after opening the second solenoid valve.

5. The method of claim 1 wherein directing external feed water to the RO system only includes water from the storage tank during a purge function of the RO system.

6. The method of claim 1 further comprising a step of cooling the RO system by directing feed water from one of the storage tank or the external feed water supply.

\* \* \* \* \*